March 1, 1938. G. S. RIPPEY 2,110,112
APPARATUS FOR SPRAYING EXTENSIVE AREAS
Filed Nov. 19, 1935 4 Sheets-Sheet 4

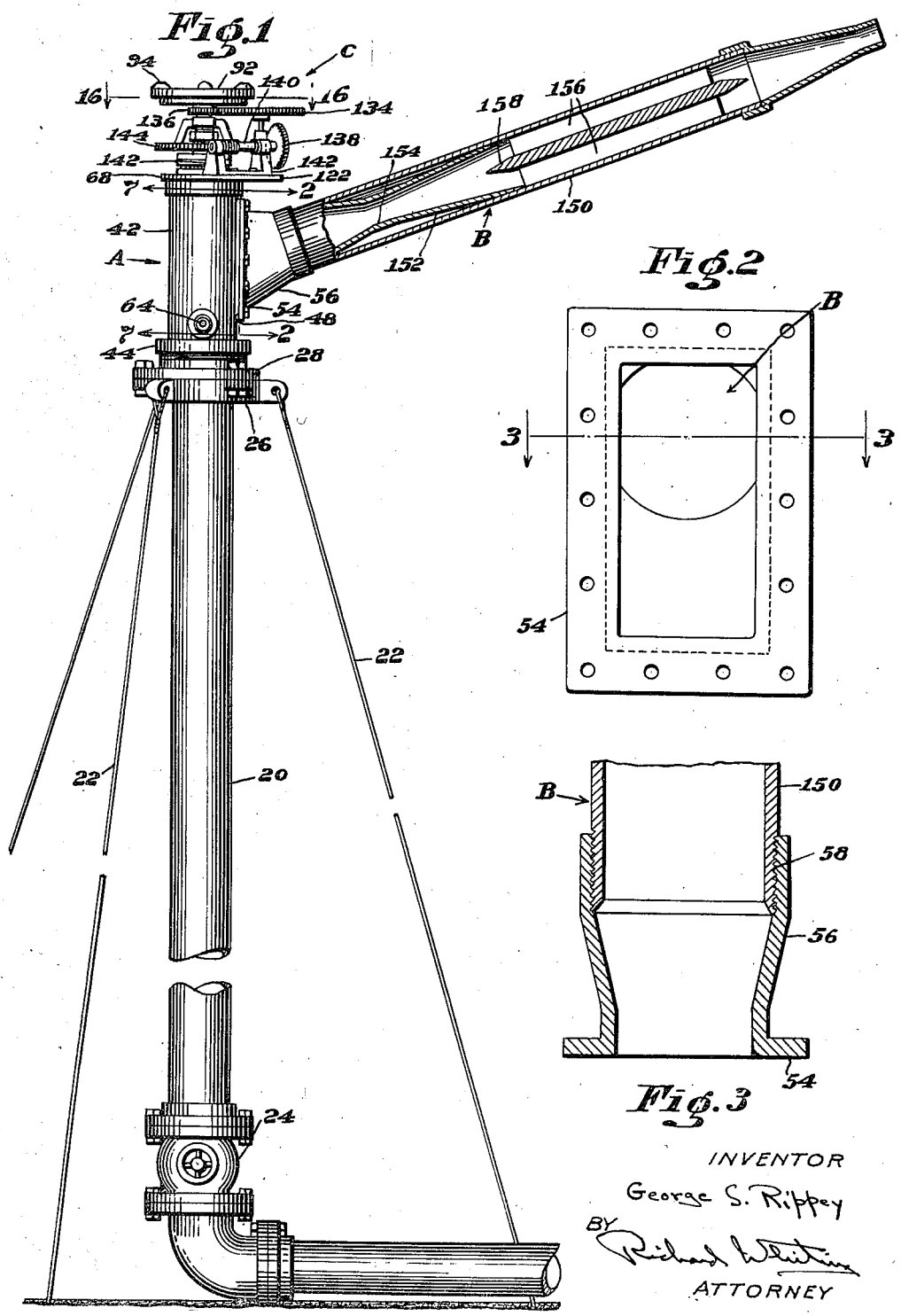

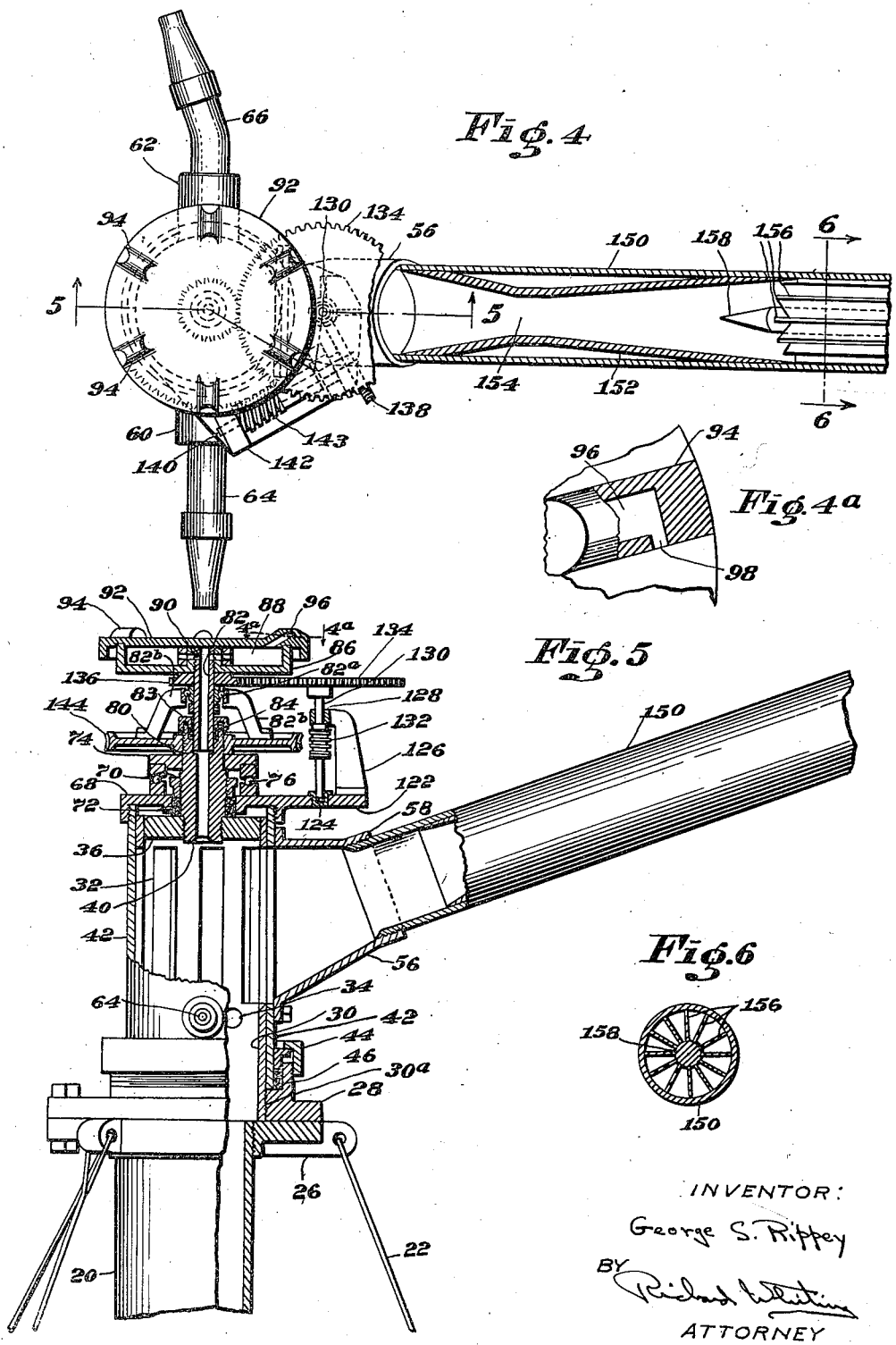

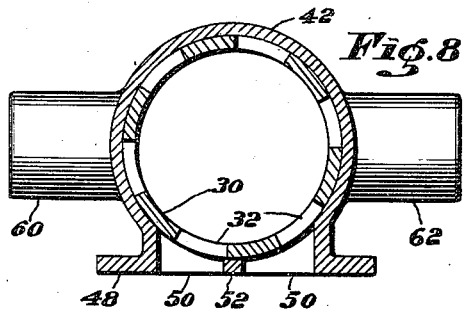
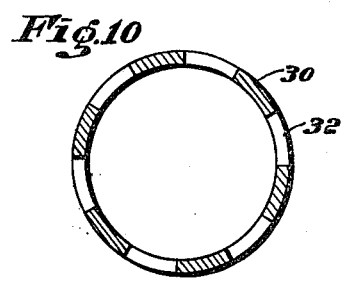
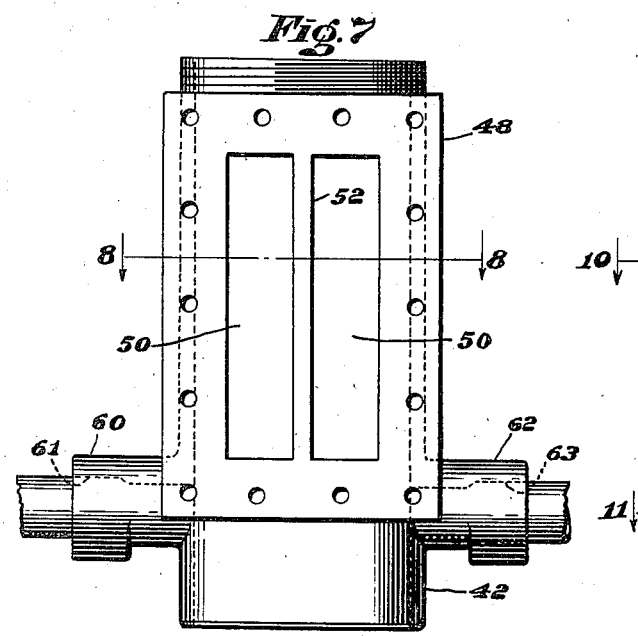
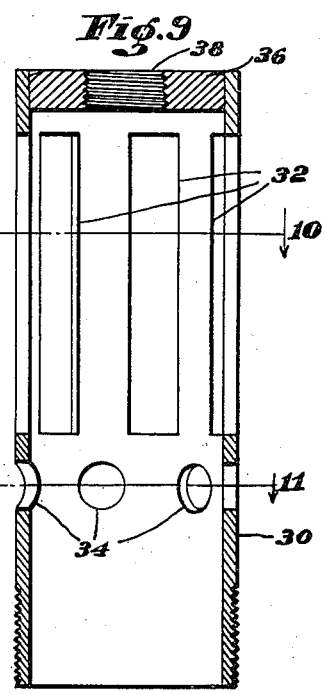
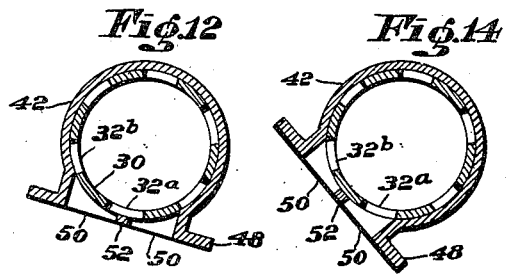
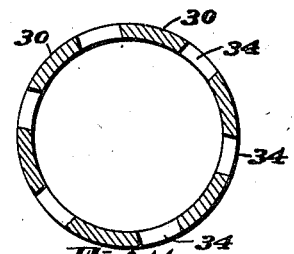
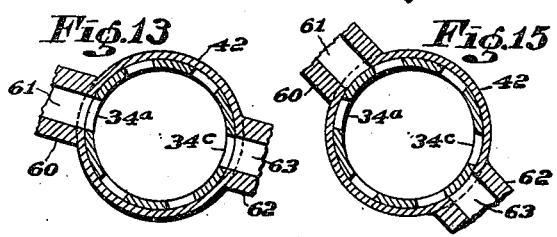

INVENTOR:
George S. Rippey
BY Richard Whiting
ATTORNEY

Patented Mar. 1, 1938

2,110,112

UNITED STATES PATENT OFFICE 2,110,112

APPARATUS FOR SPRAYING EXTENSIVE AREAS

George S. Rippey, Puerto Castilla, Honduras, assignor to United Fruit Company, Boston, Mass., a corporation of New Jersey Application November 19, 1935, Serial No. 50,533

6 Claims. (Cl. 299—18)

This invention relates to methods and devices for spraying extensive areas, and particularly to spraying systems of that character wherein an extensive area may be uniformly sprayed with a maximum amount of water for a minimum cost of installation and operation and with a minimum of waste.

Extensive plantations are commonly sprayed by the provision of a number of sprayers dispersed throughout the area to be sprayed and spaced at equal intervals from each other. To provide a spray system of this character which may be installed and maintained at minimum cost, each of the individual sprayers in the system should be capable of spraying uniformly a maximum area and to provide such a system of individual sprayers which in the aggregate are to spray thoroughly and uniformly an extensive area, the areas sprayed by individual sprayers should not be circular in outline but should be polygonal and preferably hexagonal in shape whereby the entire system sprays a plurality of areas which fit together without overlapping of individual areas and without unsprayed portions.

The spraying system which I provide to attain the foregoing result is preferably of the type embodying a plurality of rotating spray nozzles which moisten individual areas by ejecting water from the nozzles during their rotation. Although it has been common heretofore to provide each sprayer with a plurality of outlet nozzles which rotate rapidly, I have found that larger areas can be sprayed by directing the entire water supply through a single nozzle only, rotating very slowly, thereby casting a spray of substantially greater radius for a given water supply pressure. To effect the spraying of a polygonal, and preferably hexagonal, area to prevent overlapping or partial unwetting of individual areas, I vary the water output in the single spray nozzle to produce periodic maximum and minimum amounts of water throw during each rotation of the sprayer and I preferably provide for six maximum throws, gradually reducing to six minimum throws to effect the spraying of a six-sided figure.

To ensure further that the area wetted by the slowly rotating nozzle will be of a maximum radius, I so direct the nozzle that it sprays an area remote from the base of the sprayer and in the shape of an annular band bounded interiorly and exteriorly by a hexagon, leaving unsprayed a smaller hexagonal area disposed immediately adjacent the base of the sprayer. For wetting this smaller area I provide auxiliary nozzles, each of lesser output than the main nozzle and provided with valves leading to the water supply which are so actuated as to introduce water to the auxiliary nozzles only at periods of minimum flow in the main nozzle. As will appear, by this mode of operation not only do the sprayers cover larger areas than have been sprayed by similar systems in use heretofore, but furthermore, the fluctuations in water output through the main and auxiliary nozzles of each sprayer in effect counterbalance each other whereby each sprayer draws substantially a constant amount of water from the system at all times.

It is a further object of the present invention to provide a method of spraying extensive areas which will effect the results above set forth.

These and further objects and advantages of my invention will appear from a more detailed description thereof taken in connection with the accompanying drawings, in which—

Fig. 1 is an assembly view of my sprinkler, with a part of the main nozzle shown in cross-section;

Fig. 2 is a partial elevation on the lines 2—2 of Fig. 1;

Fig. 3 is a cross-section taken on the line 3—3 of Fig. 2;

Figure 16:
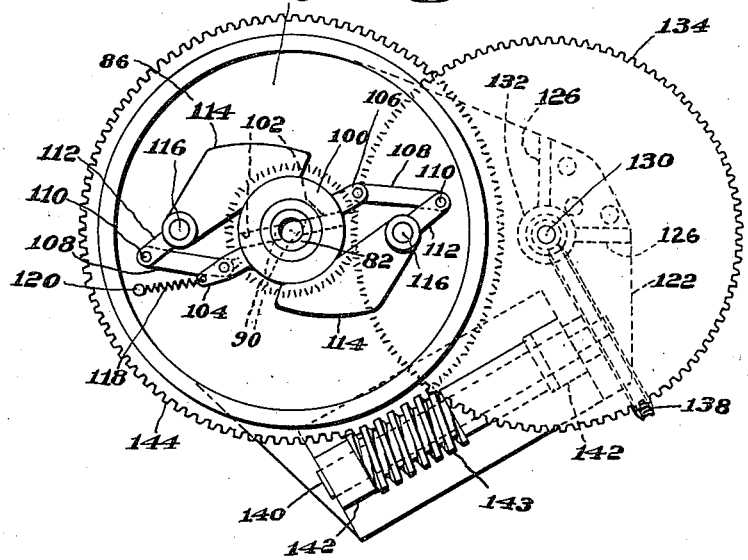
Figure 17:
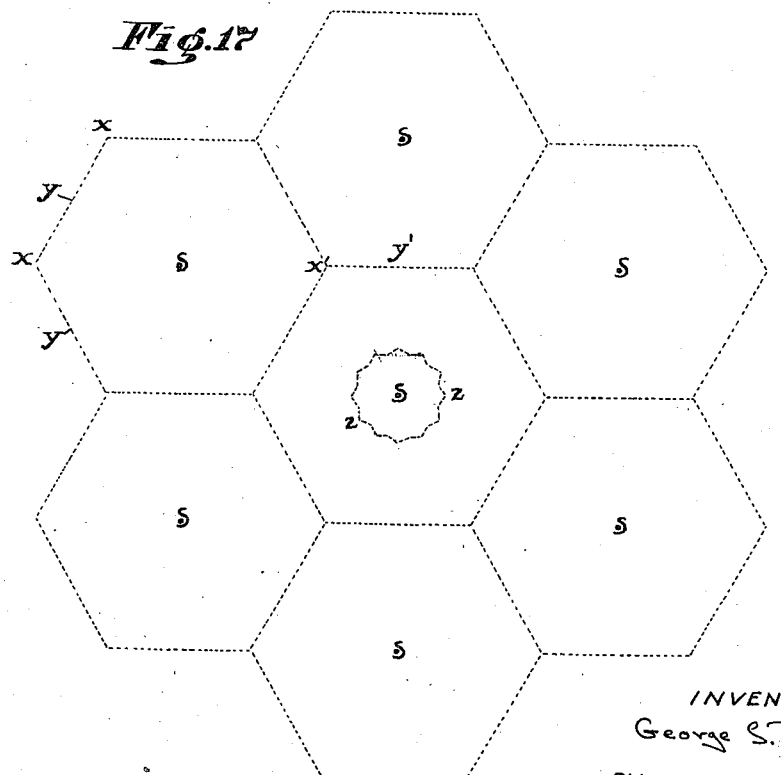

Fig. 4 is a plan view of my sprinkler, with the main nozzle shown in cross-section, Fig. 4a is an enlarged detail of Fig. 5 in partial cross-section, taken on the line 4a—4a, Fig. 5 is a cross-section of my sprinkler, taken on the lines 5—5 of Fig. 4, Fig. 6 is a cross-section of the main nozzle on the line 6—6 of Fig. 4, Fig. 7 is an elevation of one part of my device, taken on the line 7—7 of Fig. 1, Fig. 8 is a cross-section taken on the lines 8—8 of Fig. 7, Fig. 9 is an enlarged detail of parts shown in Fig. 5, Fig. 10 is a cross-section taken on the lines 10—10 of Fig. 9, Fig. 11 is a cross-section taken on the line 11—11 of Fig. 9, Figs. 12, 13, 14 and 15 are cross-sectional illustrations of periodic relations of ports and valves, Fig. 16 is a section taken on lines 16—16 of Fig. 1, showing details of my water motor, and Fig. 17 is a diagrammatic illustration of areas irrigated by a series of my devices.

In Fig. 1 I have illustrated an assembled individual sprinkler showing my distributor head generally at A, my main nozzle at B, and my water motor and reduction gearing generally at C. In practicing the method of irrigation which I have found most effective, each distributor head is mounted on the top of a supply pipe such as 20, shown in Fig. 1, so that the nozzle may be as much as 25 ft. or more above the ground. Support may be provided for the assembly such as the guy wires 22 which I have illustrated in Fig. 1. Obviously, however, my sprinkler is suitable for use at any desired elevation.

As shown in Fig. 1, the supply pipe 20 may be provided with a valve 24 and, at its top, with a flange 26, to which may be attached the distributor head A. For this purpose I provide the distributor head with a corresponding flange 28, provided with a central opening. This flange 28 may be bolted to the supply pipe flange 26 as shown in Fig. 1.

Referring now to Fig. 5, I fasten in the central opening of this flange 28, as by screw threads 30a, a cylindrical member 30, shown in Fig. 9, having certain ports 32 and 34 in its periphery for a purpose to be later described, and closed at its top by an internal plug 36 having a screw threaded outlet 38. As shown in Fig. 5, a pipe 40 is screwed into outlet 38 and comprises the support for the water motor C which will be hereinafter described.

As shown in Fig. 5, a cylindrical shell 42 is rotatably positioned concentrically around the cylindrical member 30, and is seated on the flange 28 by means of a screw threaded collar 44. Intervening packing such as 46 may be provided. For a reason later to be described, it is unnecessary to provide any bearing between the cylindrical shell 42 and the flange 28.

Upon this shell are mounted my nozzles in a manner now to be described. The cylindrical shell 42 is provided, as well illustrated in Figs. 7 and 8, with a flattened shoulder 48, which shoulder has valve ports 50, 50 separated by a rib 52.

Bolted to the flattened shoulder 48 of the cylindrical shell 42, as illustrated in Fig. 1, is a plate member 54, shown in Figs. 2 and 3, having integral therewith a hollow, shaped extension 56 provided at its end with interior screw threads 58. Fixedly positioned in the tubular extension 56 is the nozzle B of a construction to be later described.

The cylindrical shell 42 also has integral therewith in its lower portion diametrically opposed bosses 60, 62 (Fig. 7). Outlets 61 and 63 are provided from the bore of the shell 42 through each of these bosses. As shown in Fig. 4, auxiliary nozzles 64 and 66 are respectively positioned in the bosses 60 and 62.

The cylindrical shell 42, as shown in Fig. 5, is closed at the top by an annular cap 68, screw-threaded as indicated, for securing the cap to the upper edge of rotatable cylinder 42 and the cap 68 is apertured centrally to receive the stationary pipe 40. Packing material 72 is interposed between the pipe 40 and cap 68 and is secured in place by a suitable nut 70. The upward thrust against cap 68 exerted by the water pressure within is resisted by thrust bearing 76 interposed between the cap and collar 74 secured to shaft 40.

From the foregoing description it will be apparent that the outer cylinder 42 is adapted for rotation about the concentric stationary cylinder 30, thereby moving the nozzles carried by the outer cylinder in circular paths. I employ the relative rotation of the cylinders 30 and 42 not only to direct the stream of water issuing from the nozzles over paths surrounding the axis of the cylinders as a center, but also to vary the water output through each nozzle whereby a hexagonal area is sprayed.

Referring now to Fig. 9, the cylindrical member 30 is provided with a series of six ports 32, equally spaced about its periphery, and, in this embodiment, rectangular in shape, each of a width approximately $\frac{1}{12}$ of the circumference of the outer surface of member 30, and of a height approximately five times the width.

As illustrated in Figs. 9 and 11, the cylinder 30 is provided, below the ports 32, with a further series of six ports 34, circular in formation and staggered in relation to the ports 32. Each of the ports 34, in this specific embodiment, has a diameter slightly less than $\frac{1}{12}$ of the circumference of the outer surface of stationary cylinder 30.

When rotatable cylinder 42 is mounted about the stationary cylinder 30, the valve ports 50 register with the series of ports 32, and the outer edges of the valve ports 50 span an arc equal to 90° of the outer circumference of the inner stationary cylinder 30, or a distance equal to that between the remote edges of two adjacent ports 32.

Assuming for the moment means to rotate the shell 42 about the stationary cylinder 30, the operation of the ports and valve ports may be best understood by reference to Figs. 12–15. When a constant pressure supply is made available to the device through supply pipe 20, if valve ports 50, 50 happen to be in the relation to the stationary member 30, shown in Fig. 12, the rib 52 will be substantially midway across the port 32a, the outer edges of valve ports 50, 50 extending across $\frac{3}{12}$ of the outer circumference of the stationary member 30.

Therefore in the position shown in Fig. 12, the communicative passageway from the reservoir within cylinder 30 to the main nozzle will be of less area than that of one of the ports 32 and particularly the one indicated at 32a in Fig. 12, because of the interposition of the rib 52.

As the shell rotates clockwise about the stationary member 30, as shown in Fig. 12, the left-hand valve port 50 passes into register with the port 32b thereby enlarging the communicative passageway until the shell 42 reaches the position illustrated in Fig. 14. At this point the communicative passageway is the combined area of the two ports 32a and 32b.

As will be understood therefore, Fig. 12 illustrates a point of rotation when a minimum supply of fluid is directed through the ports 50 to the main nozzle B, and Fig. 14 illustrates a point of rotation where the supply of fluid directed to the main nozzle is at a maximum. A complete revolution of the shell 42 about the member 30 will present a total of six minimum positions, corresponding to that shown in Fig. 12, and six maximum positions, corresponding to that shown in Fig. 14. Intermediate these twelve positions, the area of the communicative passageway is progressively increased or decreased as the case may be, but communication from the bore of the cylindrical member 30 to the main nozzle is always maintained.

The result of such construction is illustrated diagrammatically in Fig. 17, the points S, illustrating the position of a sprinkler, and the letters $x$ illustrating points of maximum throw and the letters $y$ illustrating points of minimum throw; that is, when the port valves of the rotating shell 42 are in the position shown in Fig. 12, the fluid will be directed to a point $y$. When the position shown in Fig. 14 is reached the spray will be directed towards the maximum point $x$.

The spray through the main nozzle B will fall theoretically on an annular area relatively remote from the distributor. In order to insure irrigation of areas adjacent the head, spray is intermittently ejected from the auxiliary nozzles. This is accomplished as follows. The outlets 61 and 63 (Fig. 7) in the bosses 60 and 62 are adapted to register in rotation of the shell 42 with the ports 34 in the stationary shell 30, and the relation of the outlets 61 and 63 in the bosses 60, 62, to the ports 50, 50, and the relation of the ports 32 to the ports 34 in the stationary member 30, provide the following operation:—

Referring to Figs. 13 and 15, I have illustrated the positions of the bosses 60, 62 at points of rotation when the nozzle B is respectively in the positions shown in Figs. 12 and 14. Because of the staggered relation of the auxiliary ports 34 to the main ports 32, together with the position of the auxiliary nozzle outlets 61 and 63, each at an angle of 90° from the main nozzle B, the auxiliary outlets 61 and 63 will be in the position shown in Fig. 13 when the main ports and valves are in the position shown in Fig. 12. As illustrated in Fig. 13, in this position the auxiliary outlets 61 and 63 are in full register with auxiliary ports 34a and 34c respectively, and a maximum communication is provided from the bore of member 30 to the nozzles 64 and 66.

As the shell rotates, the auxiliary outlets revolve and slowly close such communication, thereby cutting down the feed to the auxiliary nozzles, until, when the auxiliary outlets reach the position shown in Fig. 15, there is no communication from the reservoir, and the spray from the auxiliary nozzles 64 and 66 is completely cut off. At this point in rotation, the main valve ports 50, 50 are in the position shown in Fig. 14, previously described as being the maximum communicative position.

Because the spray of the auxiliary nozzles 64 and 66 is intermittent, though simultaneous, in order to spray adjacent areas completely it is necessary to have one auxiliary nozzle spray areas which are passed over by the other auxiliary nozzle during periods when there is no flow therethrough. This is accomplished by directing the nozzle 66, as shown in Fig. 4, at an angle 30° off diametrically opposite position.

Turning attention again to Fig. 17, the result of the relationship of the ports and valve ports is such that as the main spray increases to maximum at point $x'$, the auxiliary sprays decrease to cessation, and correspondingly, as the main spray decreases to minimum, such as at point $y'$, the auxiliary sprays recommence and increase to maximum at points $z$.

In my particular device, which has just been described, the relationship of the areas of the ports and valve ports is such that the combined communicative port area insures a substantially constant demand upon the supply, and prevents any overloading.

In order to provide rotation of the nozzles, my sprinkler includes a novel water motor which as hereinbefore stated is illustrated at C in Fig. 1. The construction thereof is shown in more detail in Figs. 4, 5 and 16. As shown in Fig. 5 and as hereinbefore described the pipe 40 which supports the motor is supported in the top of the stationary member 36. The top of this pipe 40 is provided with an annular recess 80 to receive rotatably the tubular shaft 82. An annular cap 83 closes the top of the pipe 40, and proper packing 84 may be provided between the cap 83 and the shaft 82. The shaft 82 has a bearing 82a supported on arms 82b fixed to stationary gear 144 which is rigidly secured to the top of stationary pipe 40.

Enclosing the top of tubular shaft 82 and fixed thereto is a casing 86 defining an annular chamber 88. Tubular shaft 82 is provided with diametrically opposed outlets 90 which lead to the annular chamber 88, as shown in Fig. 5.

The casing 86 has a top plate 92 which is provided on top, as shown in Fig. 4, with six bosses 94 into each of which is drilled a slanting channel 96, each leading from the annular chamber 88. The channels 96 are each intersected in the bosses at right angles by a small channeled outlet 98, as shown in Fig. 4a.

When water is supplied to the device a portion thereof rises from the bore of member 30, through the tubular pipe 40, through the tubular shaft 82 and outlets 90 into the chamber 88, thence through the six channels 96, around the right-angled turns, and through the outlets 98. This induces a rotation of the entire casing 86 in a counterclockwise direction, as shown in Fig. 4, the entire motor revolving in the bearing 82a.

In order to provide a smooth and steady rotation, my motor contains a governor, which is mounted in the interior of the casing 86, as shown in Fig. 16. Mounted about the tubular shaft 82 is a rotatable collar 100 having diametrically opposed ports 102 adapted to register with the ports 90 in the tubular shaft 82. The collar 100 has two projections 104, 106, to the ends of which are attached links 108 which are pivotally connected at points 110 to arms 112. The arms 112 carry weighted members 114 and the arms are intermediately pivoted on pins 116 which are fixed in the casing 86.

As will be understood, counterclockwise rotation of the casing 86 will induce a centrifugal action on arms 112 due to the weighted members 114, which will tend to cause additional rotation in the collar 100 in a counterclockwise direction through the links 108. Such rotation will carry ports 102 gradually out of register with rotating ports 90 in the tubular shaft and thereby lessen flow therethrough, thus diminishing the speed of flow through outlets 98 and diminishing the rotational force imparted to the casing.

The speed of rotation of the motor may be regulated by the tension of a spring 118, which may be fastened to the end of collar projection 104 and anchored at 120 in the casing 86, thus acting against the centrifugal force imparted to the arms 112 and collar 100. In my device I have proportioned the tension of the spring so that the speed of the motor C remains substantially constant at approximately 300 R. P. M. under a water pressure which may vary from approximately 65 pounds to 120 pounds per square inch.

By means of appropriate reduction gearing now to be described, I employ my motor at this speed to impart a rotation to the nozzle carrying shell 42 at a speed of approximately one revolution per half hour. This requires reduction gearing of about 9500—1 which is provided in the following manner:—

Referring to Fig. 5, the top 68 of cylindrical shell 42 is provided with an extension table 122 having a bearing 124. Also mounted on the table is a standard 126 having a bearing 128 vertically aligned in relation to bearing 124. Journaled in these bearings 124 and 128 is a vertical shaft 130 having a worm 132 and carrying at its top a gear 134. The gear 134 meshes with a pinion 136 fixedly mounted on the tubular shaft 82.

The worm 132 mounted on the vertical shaft 130 engages mechanism shown in Figs. 1 and 16 (omitted for purposes of clearness from Fig. 5), including a pinion 138 fixed on a horizontal shaft 140 rotatably held in supports 142, 142, rising from the extension table 122. This horizontal shaft 140 carries a worm 143, the threads of which engage the aforesaid stationary gear 144 secured on the stationary pipe 40, as shown in Fig. 5.

Thus, rotation of the casing 86 results in rotation of the train of gears and worms just described so that the extension table 122 revolves as the worm 143 travels about the stationary gear 144. Such movement carries the nozzles about the axis of the sprinkler.

Because of the rotation of my nozzle B and the directional turn of the water, I have found that a considerable turbulence is present as the water enters the nozzle. In order to increase the maximum throw I have provided an internal nozzle construction which removes such turbulence prior to actual emission from the nozzle.

Referring now to Figs. 1 and 4, I secure on the interior of the nozzle tube 150, a Venturi throat 152 having a restricted portion 154, which increases the velocity and tends to dampen the turbulence of the stream. Positioned beyond such throat is a series of twelve fins 156, shown in cross-section in Fig. 6, which are positioned longitudinally of the nozzle about a hub 158 which tends to direct the stream to the peripheral portion of the nozzle while the fins remove rotational movement, so that the stream emerging from the nozzle opening is of such even and smooth character as to allow maximum throw.

As shown in Fig. 17, a series of my sprinklers spaced in triangular formation at distances equal to double the minimum throw of each sprinkler will allow complete irrigation of any extensive area. In my device as described, my maximum throw in operation with 85 pounds per square inch supply pressure and a $3\frac{3}{16}$ inch bore in the stationary member 30 is approximately 236 ft., while the minimum throw is approximately 205 ft. The auxiliary nozzles 64 and 66 spray a varying distance of 42 to 50 ft. Each sprinkler thus covers an area of approximately 3½ acres.

As used with 85 pounds pressure per square inch supply, there is a consumption of 500 gallons per minute, the water motor requiring approximately three or four gallons per minute at the speed producing one revolution of the shell 42 per half hour. The device may be constructed to weigh as little as 75 pounds, such weight being possible because of the small character of the distributor head, despite the large coverage of the device.

I claim:

1. A liquid distributor comprising a head, including a stationary member and a rotatable shell, said member having ports, said shell having valve ports and a rib intermediate said valve ports, said valve ports being adapted to variously register with said ports in rotation of said shell, and a nozzle associated with said valve ports.

2. A sprayer comprising a liquid-receiving chamber, a nozzle mounted adjacent said chamber, means to rotate said nozzle about said chamber, a series of six ports of predetermined width, spaced from each other about the periphery of said chamber, valve means associated with said nozzle having a plurality of openings being adapted successively to register with all of said ports, and of a combined width simultaneously to register with a plurality of said ports to provide communication from said chamber to said nozzle, and a rib connecting the said openings, of a width less than that of any of said ports.

3. In a sprayer of the character described, the combination of a liquid supply chamber, means for continuously introducing to said chamber a predetermined supply of liquid, a plurality of nozzles mounted adjacent said chamber, means to rotate said nozzles, means to direct liquid continuously from said chamber through one of said nozzles and adapted periodically to direct substantially the entire supply and periodically to direct a portion only of said supply through said nozzle, and means periodically to direct substantially the entire balance of said supply to other nozzles.

4. In a sprayer of the character described, a distributor head, a plurality of nozzles mounted adjacent said head, means to rotate said nozzles about said head, means to direct a supply of liquid through one of said nozzles continuously during said rotation, said means being adapted for varying in definite sequence the supply of liquid to said nozzle during each rotation thereof, and means to direct a supply of liquid to said other nozzles intermittently during each rotation thereof, said means being adapted for varying in definite sequence the supply of liquid to said other nozzles during each rotation thereof.

5. In a sprayer of the character described, the combination of a liquid supply chamber, means for continuously introducing to said chamber a predetermined supply of liquid, a plurality of nozzles mounted adjacent said chamber, means to rotate said nozzles, means periodically directing substantially the entire supply and periodically directing a portion only of said supply through one of said nozzles to distribute liquid continuously to an area relatively remote from said sprayer and means periodically directing the balance of said supply to other nozzles to distribute liquid intermittently to an area adjacent said sprayer.

6. In a sprayer of the character described, the combination of a liquid supply chamber, means supplying liquid to said chamber at a substantially constant pressure, a nozzle mounted adjacent said chamber, means to rotate said nozzle, means directing liquid from said chamber to said nozzle, means periodically diminishing the quantity of liquid directed to said nozzle and outlet means for diverting the balance of said supply during the diminishing flow in said nozzle whereby to maintain substantially constant the amount of liquid flowing from said chamber.

GEORGE S. RIPPEY.